(12) United States Patent
Riha et al.

(10) Patent No.: US 8,800,705 B2
(45) Date of Patent: Aug. 12, 2014

(54) ROLL-OUT CAB FOR OFF-ROAD EQUIPMENT

(75) Inventors: Gary D. Riha, Green Bay, WI (US); Michael J. Koss, Wausau, WI (US)

(73) Assignee: Barko Specialty Equipment, LLC, Superior, WI (US)

( * ) Notice: Subject to any disclaimer, the term of this patent is extended or adjusted under 35 U.S.C. 154(b) by 97 days.

(21) Appl. No.: 12/870,894

(22) Filed: Aug. 30, 2010

(65) Prior Publication Data

US 2012/0318594 A1    Dec. 20, 2012

(51) Int. Cl.
  *B62D 33/063*    (2006.01)
  *B62D 33/06*    (2006.01)
  *E02F 9/16*    (2006.01)

(52) U.S. Cl.
  CPC ........ *B62D 33/0636* (2013.01); *B62D 33/0617* (2013.01); *E02F 9/166* (2013.01)
  USPC ................. 180/89.17; 180/89.13; 296/190.04

(58) Field of Classification Search
  CPC ........... B62D 33/0617; B62D 33/0633; B62D 33/0636; E01C 2301/30; E02F 9/166
  USPC ..................... 180/89.12, 89.13, 89.16, 89.17; 296/190.04
  See application file for complete search history.

(56) References Cited

U.S. PATENT DOCUMENTS

| | | | |
|---|---|---|---|
| 3,595,409 A | 7/1971 | Bowman-Shaw | |
| 3,947,142 A * | 3/1976 | Takata et al. | 404/126 |
| 4,427,090 A * | 1/1984 | Fredriksen et al. | 180/327 |
| 5,623,410 A | 4/1997 | Furihata et al. | |
| 7,004,275 B1 * | 2/2006 | Junga et al. | 180/89.13 |
| 7,204,546 B2 * | 4/2007 | Antonetti | 296/190.04 |
| 7,222,688 B2 | 5/2007 | Watanabe | |
| 7,648,193 B2 * | 1/2010 | Fujiwara et al. | 296/190.07 |
| 2003/0158638 A1 | 8/2003 | Yakes et al. | |
| 2006/0034661 A1 | 2/2006 | Junga et al. | |

FOREIGN PATENT DOCUMENTS

| | | | |
|---|---|---|---|
| JP | 4-146822 | * 5/1992 | 180/89.13 |
| JP | 06245831 | 9/1994 | |
| JP | 10159132 | 6/1998 | |
| JP | 11181832 | 6/1999 | |

OTHER PUBLICATIONS

International Search Report for PCT/US2011/048609 mailed Mar. 12, 2012, 2 pgs.
Written Opinion for PCT/US2011/048609 dated Mar. 12, 2012, 6 pgs.
International Preliminary Report on Patentability for PCT/US2011/048609 dated Mar. 5, 2013, 7 pgs.

* cited by examiner

*Primary Examiner* — Paul N Dickson
*Assistant Examiner* — Timothy Wihelm
(74) *Attorney, Agent, or Firm* — Brinks Gilson & Lione

(57) ABSTRACT

A roll-out cab for off-road equipment includes an operator cab and a slide assembly. The slide assembly includes a slide base, a cab carriage and an actuation device. The slide base preferably includes a base plate, a pair of base rails and at least two base rollers. The cab carriage preferably includes a carriage plate, a pair of carriage rails, at least two carriage rollers and a plurality of isolation mounts. The pair of carriage rails are positioned to receive the at least two base rollers. The pair of base rails are positioned to receive the at least two carriage rollers. One end of the actuation device is retained by the base plate and the other end is retained by the carriage plate. The operator cab is attached to isolation mounts. The base plate is secured to a piece of off-road equipment.

16 Claims, 7 Drawing Sheets

ROLL-OUT CAB FOR OFF-ROAD EQUIPMENT

BACKGROUND OF THE INVENTION

1. Field of the Invention

The present invention relates generally to off-road equipment and more specifically to a roll-out cab for off-road equipment, which allows a cab to be slid out for maintenance of a power source.

2. Discussion of the Prior Art

U.S. Pat. No. 3,595,409 to Bowman-Shaw discloses side loader vehicles. The Bowman-Shaw patent includes a guide means for a driver's cab extending across one end of the vehicle, a driver's cab mounted to move with respect to the guide means transversely of the vehicle, and power-operated means drivingly coupled to the cab to move the cab along the guide means.

Patent no. JP11181832 to Katsunori discloses a cabin moving mechanism in construction vehicle. The Katsunori patent includes a drive sprocket arranged at one side and a driven sprocket at the other side with an adequate spacing provided in a moving direction of the cabin, one end portion of a roller chain is fitted to the drive sprocket and attached to a fixed bracket fixed to a bottom portion of a cabin and the other end portion is fitted to the driven sprocket and then attached to a fixed bracket fixed to a bottom of the cabin, which results in the cabin capable of moving in a left to right direction.

U.S. Pat. No. 7,222,688 to Watanabe discloses a cab sliding device of industrial machine. The Watanabe patent includes a slide base that may be inserted into and withdrawn from rails and from above rails, whereby the number of man-hours for assembly can be decreased and the ease of maintenance can be increased. A cab is mounted on top of a slide base of the cab sliding device.

Accordingly, there is a clearly felt need in the art for a roll-out cab for off-road equipment, which allows a cab to be slid out for maintenance of a power source and its related components, and which allows tests to be performed on the equipment, while the cab is slid away from a power source.

SUMMARY OF THE INVENTION

The present invention provides a roll-out cab for off-road equipment, which allows a cab to be slid out for maintenance of a power source. The roll-out cab for off-road equipment (roll-out cab) includes an operator cab and a slide assembly. The operator cab includes an operator enclosure, an operator seat and operating controls. The operator seat and operating controls are contained in the operator enclosure. The slide assembly includes a slide base, a cab carriage and an actuation device. The slide base preferably includes a base plate, a pair of base rails and at least two base rollers. The pair of base rails are attached to a top of the base plate at substantially opposing sides thereof. The at least two base rollers are rotatably retained on substantially opposing sides of the base plate at one end thereof. A base actuator mount is attached to a top of the base plate at the other end thereof.

The cab carriage preferably includes a carriage plate, a pair of carriage rails, at least two carriage rollers and a plurality of isolation mounts. The pair of carriage rails are attached to a bottom of the carriage plate. The pair of carriage rails are positioned to receive the at least two base rollers. The at least two carriage rollers are attached to a bottom of the carriage plate at substantially one end thereof and are positioned to be received by the pair of base rails. The plurality of isolation mounts are retained in the carriage plate around a perimeter thereof. A carriage actuator mount extends downward from substantially the other end of the carriage plate.

One end of the actuation device is pivotally retained on the base actuator mount and the other end of the actuation device is pivotally retained on the carriage actuator mount. A bottom of the operator cab includes a plurality of cab holes, which are positioned concentrically with holes in the isolation mounts. A plurality of fasteners are inserted through the plurality of cab holes and the plurality of isolation mounts and tightened, such that the operator cab is secured to the cab carriage. The actuation device is a hydraulic cylinder, an electric actuator or any other suitable device. The base plate is secured to a bed of some type of off-road equipment. The cab carriage and operator cab cover the sliding base, when the off-road equipment is in operation. A power source of the off-road equipment may be operated from the operator cab, when the operator cab is slid away from the power source. The roll-out cab slides out far enough to allow maintenance of the power source and its related components.

Accordingly, it is an object of the present invention to provide a roll-out cab, which allows a cab to be slid out for maintenance of a power source and its related components.

Finally, it is another object of the present invention to provide a roll-out cab, which allows tests to be performed on the equipment while the cab is slid away from a power source.

These and additional objects, advantages, features and benefits of the present invention will become apparent from the following specification.

DETAILED DESCRIPTION OF THE PREFERRED EMBODIMENTS

Figure 1:
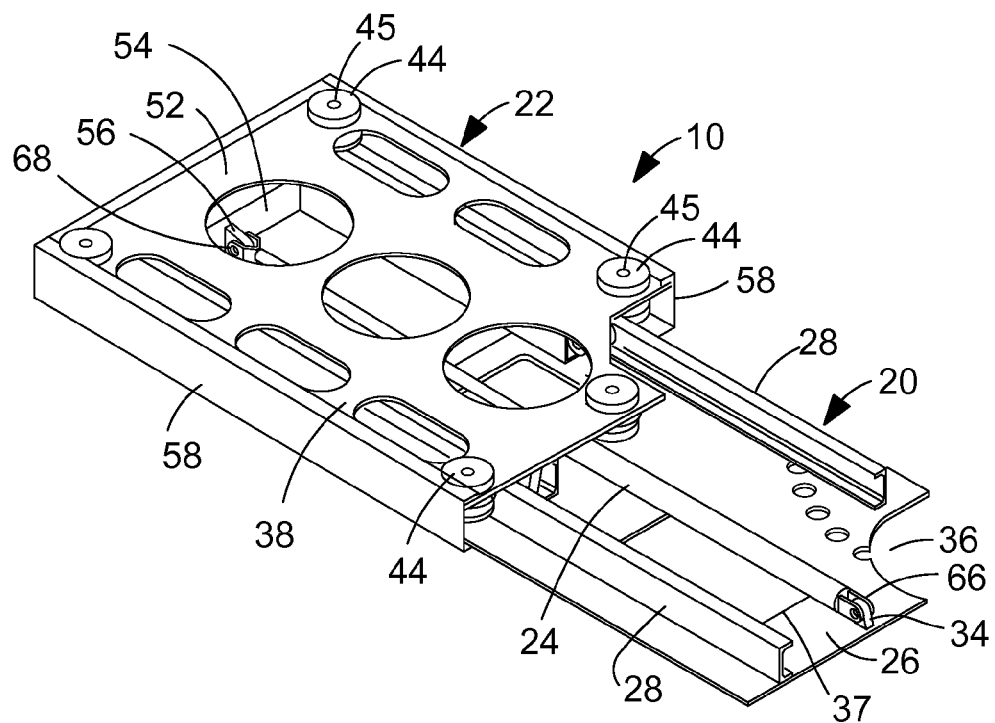
FIG. 1 is a perspective view of a slide assembly in an extended position of a roll-out cab in accordance with the present invention.
Figure 2:
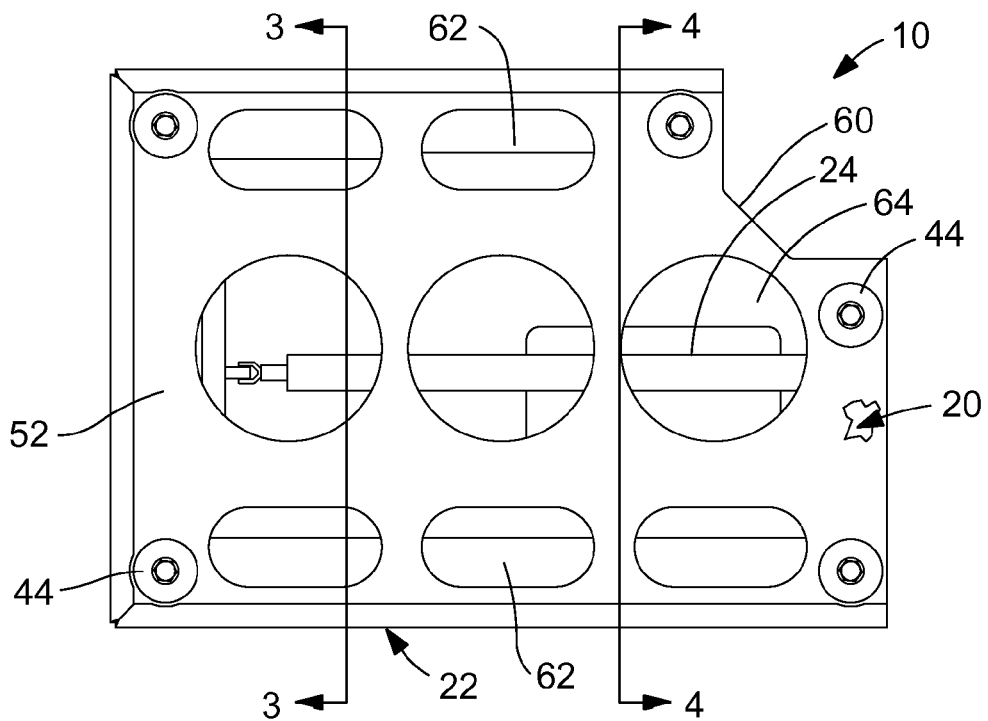
FIG. 2 is a top view of a slide assembly of a roll-out cab in accordance with the present invention.
Figure 3:
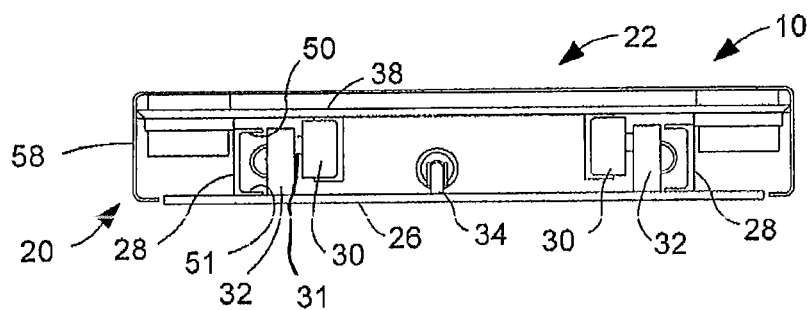
FIG. 3 is a cross sectional view of the slide assembly cut through FIG. 2, along cutting plane line 3 of a roll-out cab in accordance with the present invention.
Figure 4:
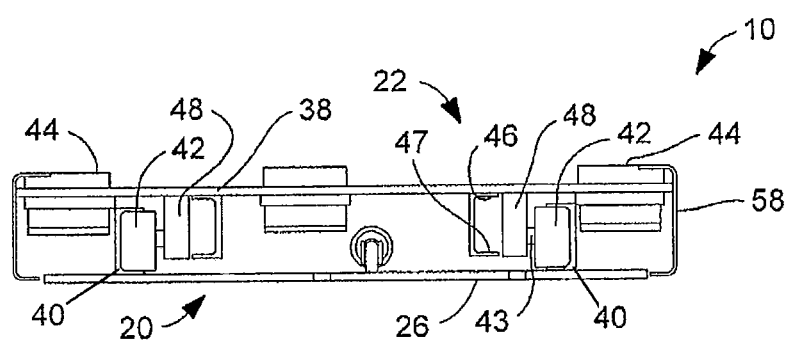
FIG. 4 is a cross sectional view of the slide assembly cut through FIG. 2, along cutting plane line 4 of a roll-out cab in accordance with the present invention.
Figure 5:
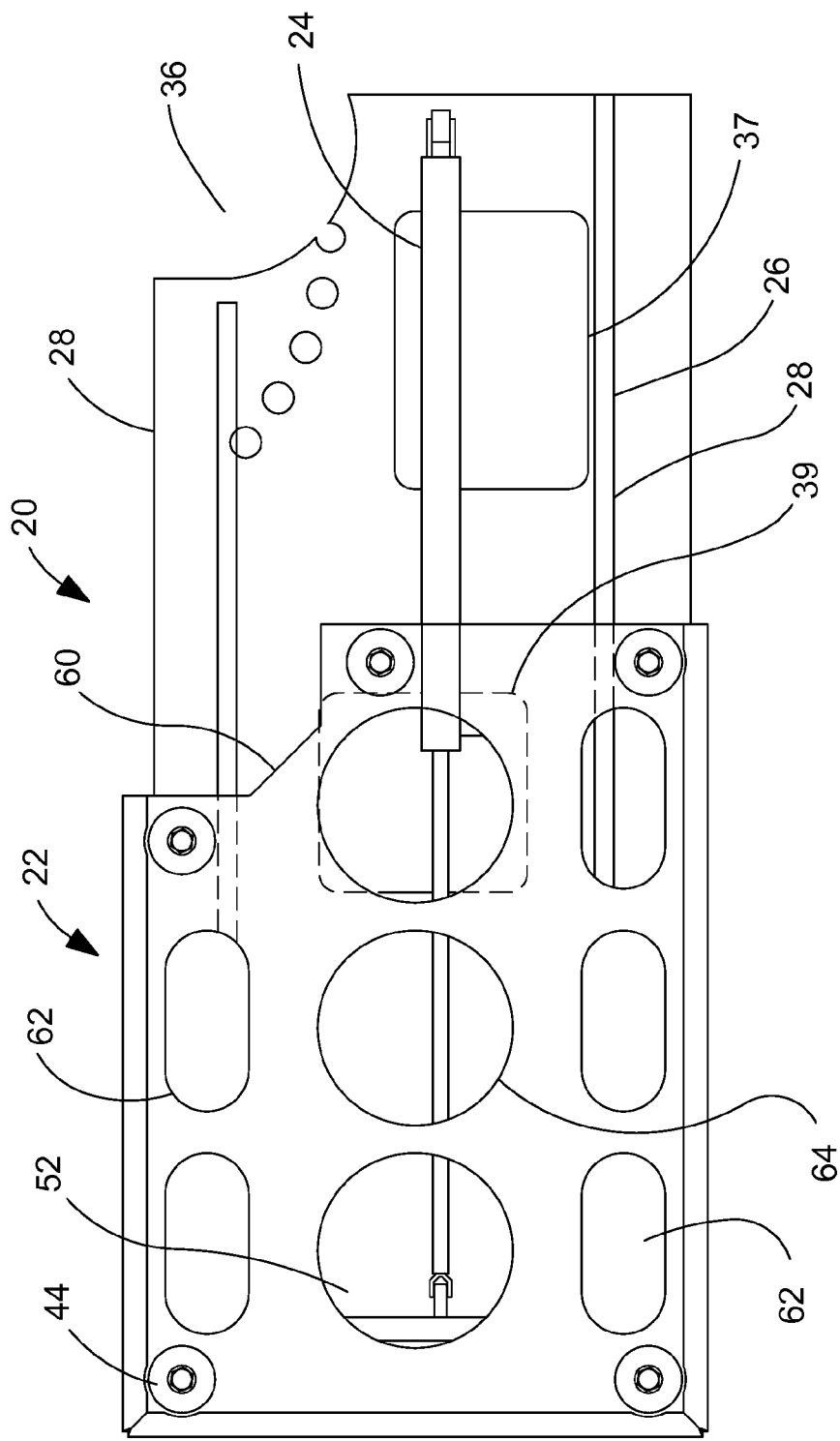
FIG. 5 is a top view of a slide assembly in an extended position of a roll-out cab in accordance with the present invention.
Figure 6:
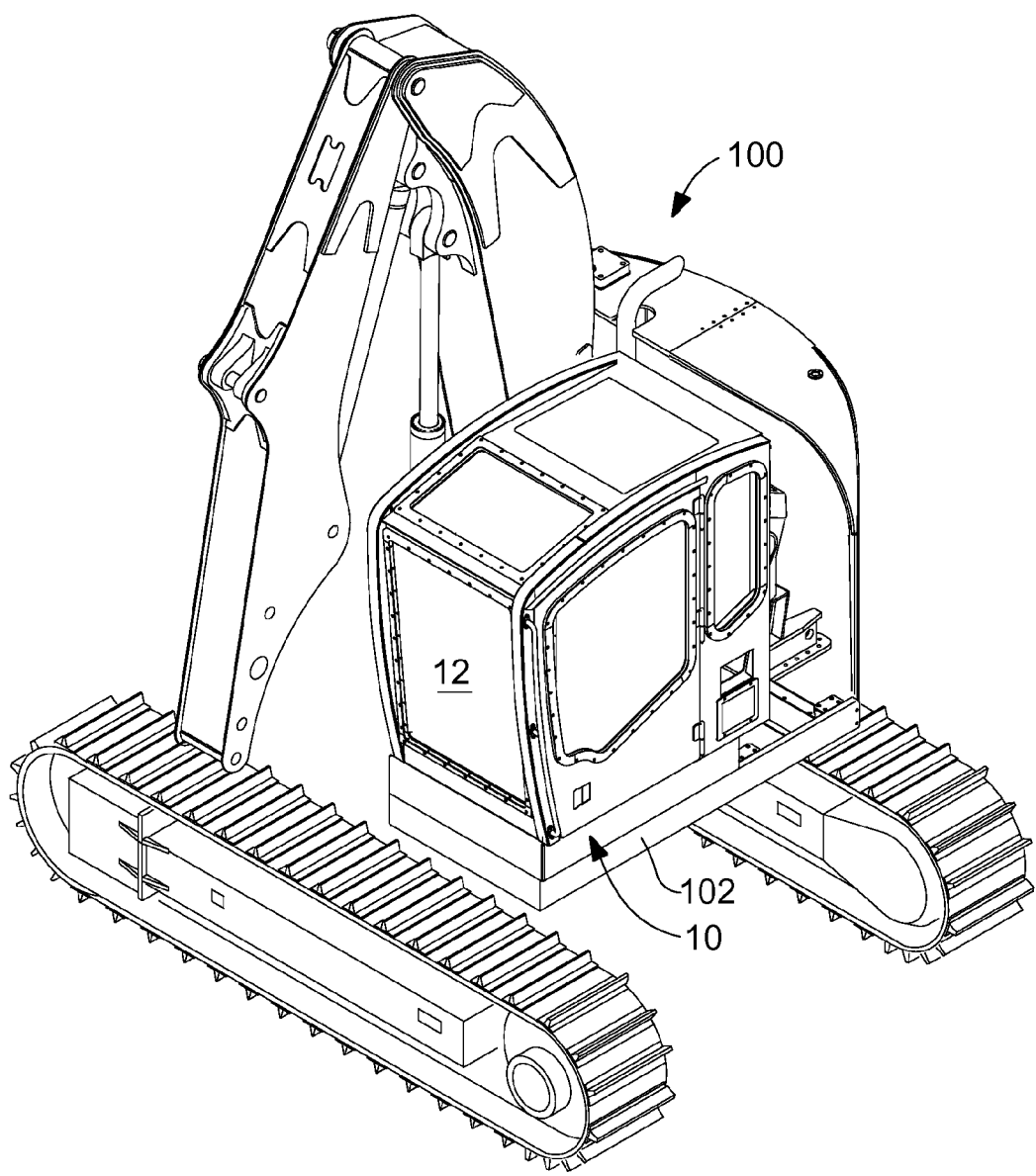
FIG. 6 is a perspective view of a piece of off-road equipment with a roll-out cab in an operating position in accordance with the present invention.
Figure 7:
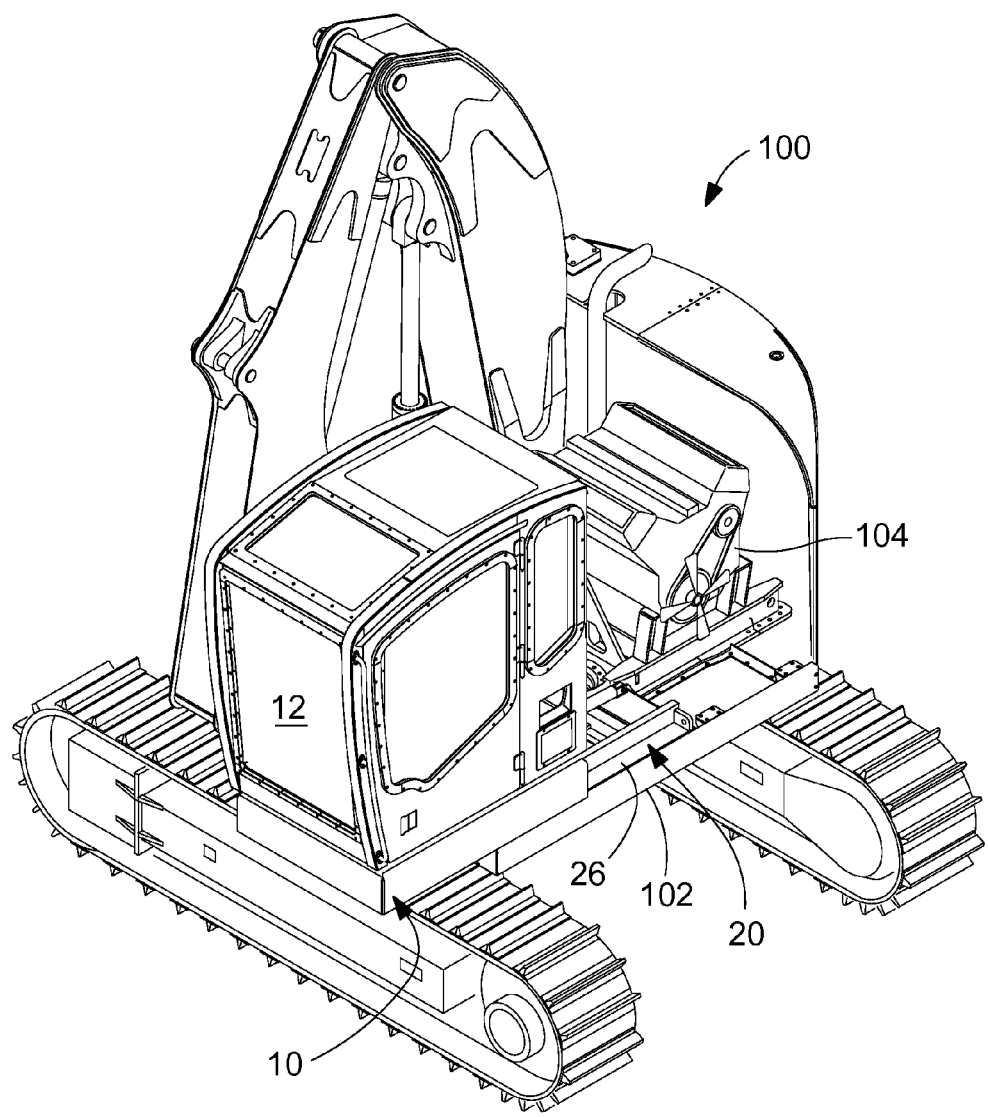
FIG. 7 is a perspective view of a piece of off-road equipment with a roll-out cab in an extended or maintenance position in accordance with the present invention.
Figure 8:
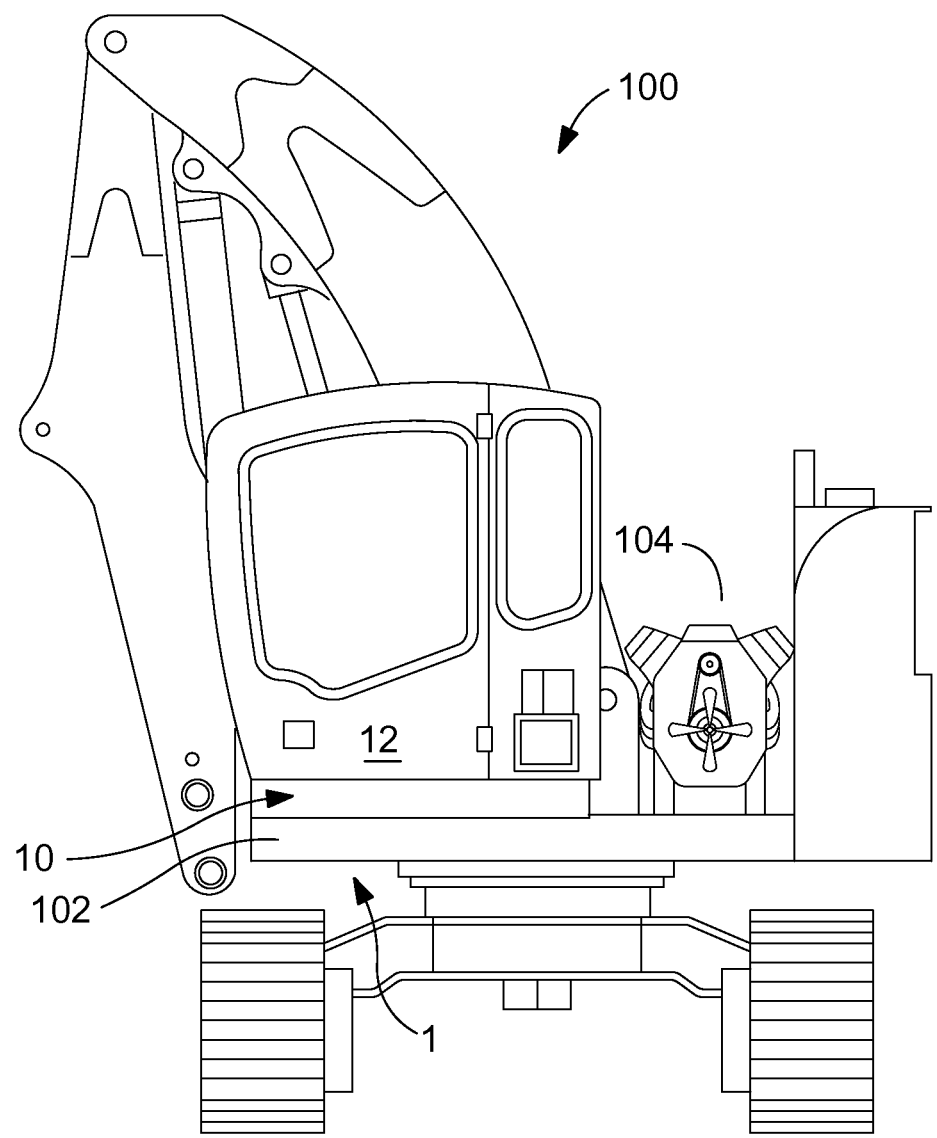
FIG. 8 is an end view of a piece of off-road equipment with a roll-out cab in an operating position in accordance with the present invention.
Figure 9:
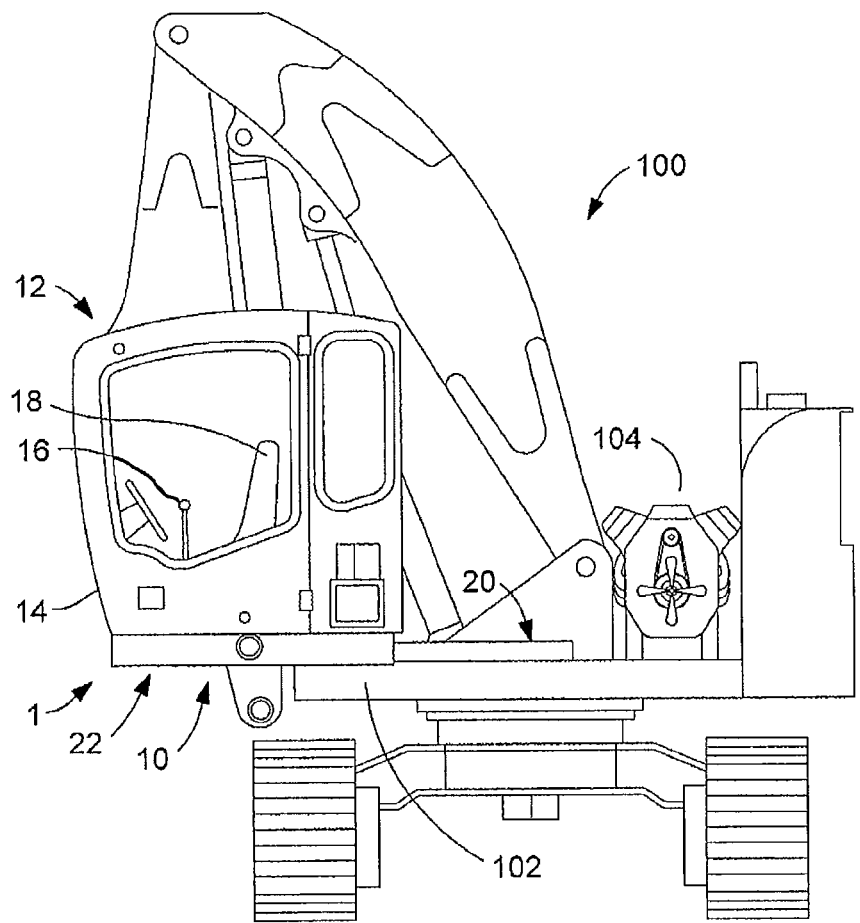
FIG. 9 is an end view of a piece of off-road equipment with a roll-out cab in an extended or maintenance position in accordance with the present invention.

With reference now to the drawings, and particularly to FIG. 1, there is shown a perspective view of a slide assembly 10 of a roll-out cab 1. With reference to FIG. 9, the roll-out cab 1 includes the slide assembly 10 and an operator cab 12. The operator cab 12 includes an operator enclosure 14, operating controls 16 and an operator seat 18. The operating controls 16 and the operator seat 16 18 are contained in the operator enclosure 14. With reference to FIGS. 2-5, the slide assembly 10 includes a slide base 20, a cab carriage 22 and an actuation device 24. The slide base 20 preferably includes a base plate 26, a pair of base rails 28 and at least two base rollers 30. The pair of base rails 28 are attached to a top of the base plate 26 at substantially opposing sides thereof with welding or the like. The base rails 28 are preferably U-channels, but other structures may also be used. A pair of base roller blocks 32 are attached with welding or the like to the top of the base plate 26 at one end thereof and at substantially opposing sides thereof. A base spindle 31 of the base roller 30 is retained by each base roller block 32. A base actuator block 34 is attached to a top of the base plate 26 at the other end thereof. A base cutout 36 is preferably formed in one corner at the other end of the base plate 26 to provide clearance for electrical, hydraulic, heating and cooling lines for a piece of off-road equipment 100. The off-road equipment 100 may be tree processing equipment, construction equipment, road building equipment or any other type of off-road equipment. A first base opening 37 and a second base opening 39 are formed through the base plate 26 to provide access to the actuation device 24 through a bed 102 of the off-road equipment 100.

The cab carriage 22 includes a carriage plate 38, a pair of carriage rails 40, at least two carriage rollers 42 and a plurality of isolation mounts 44. The pair of carriage rails 40 are attached to a bottom of the carriage plate 38 at substantially opposing sides thereof. The pair of carriage rails 40 are disposed between the pair of base rails 28. The carriage rails 40 are preferably U-channels, but other structures may also be used. The pair of carriage rails 40 are positioned to receive the at least two carriage rollers 42. A profile surface of each base roller 30 is sized to be received by inner roller surfaces 46, 47 of each carriage rail 40.

A pair of carriage roller blocks 48 are attached to a bottom of the carriage plate 38 at one end thereof and at substantially opposing sides thereof. A carriage spindle 43 of the carriage roller 42 is rotatably retained by each carriage roller block 48. The pair of base rails 28 are positioned to receive the at least two carriage rollers 42. A profile surface of each carriage roller 42 is sized to be received by inner roller surfaces 50, 51 of each base rail 28. The cab carriage 22 is slidably retained relative to the slide base 20 along a lengthwise axis of the slide base 20 and the cab carriage 22.

The inner roller surfaces 46, 47 of the pair of carriage rails 40 radially retain the at least two base rollers 30. The inner roller surfaces 50, 51 of the pair of base rails 28 radially retain the at least two carriage rollers 42. Engagement of the at least two base rollers 30 with the inner roller surfaces 46, 47 and engagement of the at least two carriage rollers 42 with the inner roller surfaces 50, 51 enable the carriage base 22 to cantilever over an end of the sliding base 20. A carriage actuator mount 52 includes a mount cross member 54 and a carriage actuator block 56. The carriage actuator block 56 extends from substantially a middle of the mount cross member 54. The mount cross member 54 is attached to a bottom of the carriage plate 38 at substantially the other end of the carriage plate 38. The mount cross member 54 is retained between the pair of carriage rails 40.

A carriage perimeter cover 58 includes a U-shaped cross section. An inner portion of the U-shaped cross section is attached to an outer perimeter of the carriage plate 38 with welding or the like. The carriage perimeter cover 58 covers an open gap between the base plate 26 and the carriage plate 38. The plurality of isolation mounts 44 are retained in mount holes formed around a perimeter of the carriage plate 38 to isolate the operator cab 12 from vibration emitting from the off-road equipment 100. The isolation mounts 44 may be purchased from any suitable manufacturer.

A carriage cutout 60 is preferably formed in one corner at the end of the carriage plate 38 to provide clearance for electrical, hydraulic, heating and cooling lines for the off-road equipment 100. A plurality of carriage openings 62, 64 are preferably formed through the carriage plate 38 to provide access to the operator cab 12, when the cab carriage 22 is in an extended orientation. One end of the actuation device 24 is pivotally retained in the base actuator mount 34 with a first clevis pin 66 or the like. The other end of the actuation device 24 is pivotally retained in the carriage actuator block 56 with a second clevis pin 68 or the like. The actuation device 24 is preferably a hydraulic cylinder, an electric actuator or any other suitable device.

With reference to FIGS. 6-9, a bottom of the operator cab 12 includes a plurality of cab holes (not shown) that are positioned concentrically with bolt holes 45 in the plurality of isolation mounts 44. A plurality of fasteners (not shown) are inserted through the plurality of cab holes and the plurality of bolt holes 45 and tightened, such that the operator cab 12 is secured to the cab carriage 22. The base plate 26 is secured to the bed 102 of a piece of off-road equipment with welding, fasteners or any other suitable method. The cab carriage 22 and operator cab 12 cover the sliding base 20, when the off-road equipment 100 is in operation. A power source (such as an engine) 104 of the off-road equipment 100 may be operated from the operator cab 12, when the operator cab 12 is slid away from the power source 104 in an extended or maintenance orientation. A power source cover (not shown) has been removed to better illustrate the power source 104 in FIGS. 6-9. The operator cab 12 slides out far enough to allow maintenance of the power source 104 and power source related components. The cab carriage 22 is cantilevered over an end of the bed 102 of the off-road equipment 100, when the cab carriage 22 in the extended or maintenance position.

While the present description refers to off-road equipment, it is contemplated that the invention described and claimed herein may also be used for other types of equipment and vehicles.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A roll-out cab for off-road equipment comprising:
an operator cab including operating controls;
a slide base including a base plate, wherein said slide base is attached to the off-road equipment;
a cab carriage including a carriage plate, wherein said cab carriage is slidably retained relative to said slide base, said operator cab is mounted to said cab carriage, wherein the operator cab comprises extended and non-extended positions, and there is a greater spacing between the operator cab and a power source in the extended position; and
an actuation device having one end retained on said slide base and the other end retained on said carriage plate, wherein the operator cab and the power source are disposed on a common platform.

2. The roll-out cab for off-road equipment of claim 1 wherein:

said cab carriage covers said base plate when the off-road equipment is operated.

3. The roll-out cab for off-road equipment of claim 1, further comprising:
a plurality of isolation mounts retained on a perimeter of said carriage plate, wherein said operator cab is attached to the isolation mounts.

4. The roll-out cab for off-road equipment of claim 1, further comprising:
a pair of base rails attached to said base plate, a pair of carriage rails attached to said carriage plate, at least two base rollers rotatably retained by said base plate, at least two carriage rollers rotatably retained by said carriage plate, said pair of base rails radially retain said at least two carriage rollers, said pair of carriage rails radially retain said at least two base rollers, said cab carriage cantilevers over an end of said slide base when said cab carriage is in an extended position.

5. The roll-out cab for off-road equipment of claim 1, further comprising:
a perimeter cover attached to a perimeter of said carriage plate to cover a gap between said base plate and said carriage plate.

6. The roll-out cab for off-road equipment of claim 1, further comprising:
a base actuator block attached to said base plate, wherein one end of said actuation device is pivotally retained by said base actuator block.

7. The roll-out cab for off-road equipment of claim 6, further comprising:
a carriage actuator mount attached to said carriage plate, wherein the other end of said actuation device is pivotally retained by said base actuator block.

8. The roll-out cab for off-road equipment of claim 1 wherein:
said actuation device is one of a hydraulic cylinder and an electrical actuator.

9. A roll-out cab for off-road equipment comprising:
an operator cab including operating controls;
a slide base including a base plate, a pair of base rails and at least two base rollers, wherein said pair of base rails are attached to said base plate, said at least two base rollers are rotatably retained by said base plate, said slide base is attached to the off-road equipment;
a cab carriage including a carriage plate, a pair of carriage rails and at least two carriage rollers, wherein said pair of carriage rails are attached to said carriage plate, said at least two carriage rollers are rotatably retained by said carriage plate, said pair of base rails radially retain said at least two carriage rollers, said pair of carriage rails radially retain said at least two base rollers, said operator cab is mounted to said cab carriage, said operating controls are useable to run tests on a power source of the off-road equipment when said operator cab is slid away from the power source; and
an actuation device having one end retained on said slide base and the other end retained on said carriage plate.

10. The roll-out cab for off-road equipment of claim 9 wherein:
said cab carriage covers said base plate when the off-road equipment is operated.

11. The roll-out cab for off-road equipment of claim 9, further comprising:
a plurality of isolation mounts retained on a perimeter of said carriage plate, wherein said operator cab is attached to the isolation mounts.

12. The roll-out cab for off-road equipment of claim 9 wherein:
said cab carriage cantilevers from said slide base when said cab carriage is in an extended orientation.

13. The roll-out cab for off-road equipment of claim 9, further comprising:
a perimeter cover attached to a perimeter of said carriage plate to cover a gap between said base plate and said carriage plate.

14. A roll-out cab for off-road equipment comprising:
an operator cab including operating controls;
a slide base including a base plate, wherein said slide base is attached to the off-road equipment;
a cab carriage including a carriage plate, wherein said cab carriage is slidably retained relative to said slide base, said operator cab is mounted to said cab carriage, wherein the operator cab comprises extended and non-extended positions, and there is a greater spacing between the operator cab and a power source in the extended position; and
an actuation device having one end retained on said slide base and the other end retained on said carriage plate, wherein the power source and the carriage plate are mounted at substantially the same height.

15. A roll-out cab for off-road equipment comprising:
an operator cab including operating controls;
a slide base including a base plate, wherein said slide base is attached to the off-road equipment;
a cab carriage including a carriage plate, wherein said cab carriage is slidably retained relative to said slide base, said operator cab is mounted to said cab carriage, wherein the operator cab comprises extended and non-extended positions, and there is a greater spacing between the operator cab and a power source in the extended position; and
an actuation device having one end retained on said slide base and the other end retained on said carriage plate, wherein the extended position is a maintenance state and the non-extended position is an operation state.

16. The roll-out cab for off-road equipment of claim 15, wherein a base of the operator cab cantilevers over a bed in the maintenance state, but does not cantilever over the bed in the operation state.

\* \* \* \* \*